(12) United States Patent
Golden et al.

(10) Patent No.: US 7,943,097 B2
(45) Date of Patent: *May 17, 2011

(54) REACTOR SYSTEM FOR REDUCING $NO_x$ EMISSIONS FROM BOILERS

(75) Inventors: Stephen J. Golden, Santa Barbara, CA (US); Svetlana Iretskaya, Ventura, CA (US); Rajashekharam V. Malyala, Camarillo, CA (US); Guang Yuan, Ventura, CA (US); Rachelle Justice, Ventura, CA (US); Yul Kwan, Corona, CA (US); Robert Bono, Dana Point, CA (US); Ronald Roberts, Moorpark, CA (US); Alec Miller, Pasadena, CA (US)

(73) Assignee: Catalytic Solutions, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/150,943

(22) Filed: Apr. 30, 2008

(65) Prior Publication Data

US 2008/0279741 A1    Nov. 13, 2008

Related U.S. Application Data

(63) Continuation-in-part of application No. 11/731,570, filed on Mar. 29, 2007, which is a continuation-in-part of application No. 11/651,290, filed on Jan. 9, 2007, now Pat. No. 7,527,776.

(51) Int. Cl.
*B01J 23/00* (2006.01)
*B01D 50/00* (2006.01)

(52) U.S. Cl. .................. 422/180; 502/300

(58) Field of Classification Search .................. 422/168, 422/171, 172, 177, 180; 423/239.1, 210; 502/304

See application file for complete search history.

(56) References Cited

U.S. PATENT DOCUMENTS 4,004,875 A    1/1977    Zink et al.
(Continued)

FOREIGN PATENT DOCUMENTS

WO    WO-2006/044764 A1    4/2006
(Continued)

OTHER PUBLICATIONS

Eranen, et al., "Enhancement of the catalytic activity of Cu-ZSM-5 for nitric oxide decomposition by introduction of copper during the zeolite synthesis," Applied Catalysis B: Environmental, vol. 4, 1994, pp. 213-223.

(Continued)

*Primary Examiner* — Tom Duong
(74) *Attorney, Agent, or Firm* — Reed Smith LLP

(57) ABSTRACT

A zeolite based SCR catalyst for NOx reduction using a reducing agent for treating exhaust streams from industrial and commercial boilers is provided. The reactor system has a zeolite based catalyst arranged in catalyst cassettes in a modular fashion where the reactor containing the zeolite based SCR catalyst cassettes is placed in a perpendicular direction to the exhaust exiting the industrial and/or commercial boiler. The catalyst selectively reduces nitrogen oxides to nitrogen with a reducing agent at low to medium temperatures. The reactor results in high NOx conversions and very low ammonia slip and is active for a wide range of boiler firing conditions. Boilers with low NOx and/or ultra low NOx burners can be replaced with a standard conventional burner for overall emissions reduction performance, efficiency improvements and energy savings. Boilers with low NOx and ultra low NOx burners can also be fitted with this zeolite based SCR catalyst reactor for additional NOx reductions and energy savings.

40 Claims, 4 Drawing Sheets

A WATER-TUBE BOILER WITH A ZEOLITE SCR REACTOR SYSTEM.

U.S. PATENT DOCUMENTS

| | | | |
|---|---|---|---|
| 4,160,805 A | 7/1979 | Inaba et al. | |
| 4,510,265 A | 4/1985 | Hartwig | |
| 4,759,918 A | 7/1988 | Homeier et al. | |
| 4,833,113 A | 5/1989 | Imanari et al. | |
| 4,900,517 A | 2/1990 | Domesle et al. | |
| 4,912,776 A | 3/1990 | Alcorn | |
| 4,961,917 A | 10/1990 | Byrne | |
| 5,100,632 A | 3/1992 | Dettling et al. | |
| 5,413,699 A | 5/1995 | Chou | |
| 5,505,919 A | 4/1996 | Morii et al. | |
| 5,589,147 A | 12/1996 | Farnos et al. | |
| 5,681,788 A | 10/1997 | Kanesaka et al. | |
| 5,840,649 A | 11/1998 | Ichiki et al. | |
| 5,900,222 A | 5/1999 | Ito et al. | |
| 5,911,956 A * | 6/1999 | Viel Lamare et al. | 422/177 |
| 5,964,908 A | 10/1999 | Malina | |
| 5,988,115 A | 11/1999 | Anderson et al. | |
| 6,013,599 A | 1/2000 | Manson | |
| 6,089,855 A * | 7/2000 | Becker et al. | 431/9 |
| 6,284,211 B1 | 9/2001 | Miyadera et al. | |
| 6,383,463 B1 * | 5/2002 | Mochida et al. | 423/239.1 |
| 6,485,289 B1 | 11/2002 | Kelly et al. | |
| 6,609,483 B1 | 8/2003 | Albrecht et al. | |
| 6,677,264 B1 | 1/2004 | Klein et al. | |
| 6,756,336 B2 | 6/2004 | Kasahara et al. | |
| 6,780,805 B2 | 8/2004 | Faber et al. | |
| 6,971,336 B1 | 12/2005 | Chojnacki et al. | |
| 7,084,086 B2 | 8/2006 | Kasahara et al. | |
| 7,527,776 B2 | 5/2009 | Golden et al. | |
| 2001/0022956 A1 | 9/2001 | Okamoto et al. | |
| 2002/0016259 A1 | 2/2002 | Yoshikawa | |
| 2003/0083193 A1* | 5/2003 | Takaya et al. | 502/304 |
| 2005/0159304 A1 | 7/2005 | Ichiki et al. | |
| 2006/0021910 A1 | 2/2006 | Yaluris et al. | |
| 2006/0029535 A1 | 2/2006 | Ott | |
| 2006/0039843 A1 | 2/2006 | Patchett et al. | |
| 2006/0155102 A1 | 7/2006 | Lindall et al. | |
| 2006/0159607 A1 | 7/2006 | Ott | |
| 2006/0182676 A1 | 8/2006 | Tran et al. | |
| 2006/0217579 A1 | 9/2006 | Bailey | |
| 2006/0228283 A1* | 10/2006 | Malyala et al. | 423/239.1 |
| 2007/0180760 A1 | 8/2007 | Zhou et al. | |
| 2007/0269359 A1 | 11/2007 | Fisher et al. | |

FOREIGN PATENT DOCUMENTS

WO   WO-2008/085265 A1   7/2008

OTHER PUBLICATIONS

Li, et al., "Selective catalytic reduction of nitric oxide by methane over cerium and silver ion-exchanged ZSM-5 zeolites," Applied Catalysis A: General, vol. 165, 1997, pp. 15-34.

Meunier, et al., "Mechanistic differences in the selective reduction of NO by propene over cobalt- and silver-promoted alumina catalysts: kinetic and in situ DRIFTS study," Catalysis Today, vol. 59, 2000, pp. 287-304.

Miyadera, "Selective reduction of $NO_x$ by ethanol on catalysts composed of $Ag/Al_2O_3$ and $Cu/TiO_2$ without formation of harmful by-products," Applied Catalysis B: Environmental, vol. 16, 1998, pp. 155-164.

Flytzani-Stephanopoulos, et al., "Direct Catalytic Decomposition of Nitric Oxide," prepared for U.S. Department of Energy, Jun. 15, 1995.

Yang, et al., "Ion-exchanged pillared clays for selective catalytic reduction of NO By ethylene in the presence of oxygen," Applied Catalysis B: Environmental, vol. 19, 1998, pp. 289-304.

Maaskant for CRI/Criterion Catalyst Co., "The Shell Denox System (SDS) for Nitric Acid Plants," Nitrogen 2005, Bucharest, Romania.

Maaskant for CRI Catalyst Company—Environmental Catalyst and Systems, "The Shell System for NOx Removal and Dioxin Destruction from Incineration Flue Gas," $3^{rd}$ International Symposium on Incineration and Flue Gas Treatment Technologies, Jul. 2001, Brussels.

Lee et al., "Evaluation of Cu-Based SCR/DPF Technology for Diesel Exhaust Emission Control," SAE Paper 2008-01-0072, presented at SAE World Congress & Exhibition, Apr. 2008, Detroit, MI, USA.

* cited by examiner

FIGURE 2: A FIRE-TUBE BOILER WITH A ZEOLITE SCR REACTOR SYSTEM.

FIGURE 3: A WATER-TUBE BOILER WITH A ZEOLITE SCR REACTOR SYSTEM.

REACTOR SYSTEM FOR REDUCING $NO_x$ EMISSIONS FROM BOILERS

RELATED APPLICATION

This application is a continuation-in-part of U.S. application Ser. No. 11/731,570 filed Mar. 29, 2007, which is herein incorporated by reference in its entirety and which is a continuation-in-part of U.S. application Ser. No. 11/651,290, filed Jan. 9, 2007 now U.S. Pat. No. 7,527,776, which is herein incorporated by reference in its entirety.

FIELD OF THE INVENTION

The invention is a reactor (located between the exit of the boiler and the stack or in the stack) which is used to reduce $NO_x$ emissions from commercial and industrial boilers. The reactor system adds a reducing agent to the exhaust of the boiler, then the exhaust and reducing agent mix are directed through a specific type of selective catalytic reduction (hereinafter "SCR") catalyst.

BACKGROUND

Boilers

Boilers are used in various industrial and commercial applications mainly for steam generation purposes. Boilers in industrial usage include but not limited to usage in food processing plants, printing, chemical processing plants, power generation, and refining applications. Some commercial boiler applications include but are not limited to hospitals, universities, large shopping malls, offices, and airports. Two types of boilers are used in industrial and commercial applications for the purpose of steam or hot water. They are fire tube boilers and water tube boilers. The present invention may be used with either type of boiler.

While such boilers can burn any type of fossil fuel, natural gas has been an increasing source of fuel. Although natural gas is several times cleaner than many other fuels, combustion of natural gas inside such boilers results in the production of significant amount of polluting emissions. Both NO and $NO_2$ are produced and are collectively termed "$NO_x$" or "nitrogen oxides." Several regulatory agencies in the US and across the world have increased the stringent requirements for emission reductions from such industrial and commercial boilers.

Another issue facing boiler usage is rising energy costs. It would be a great benefit to find a way to reduce energy costs while increasing boiler efficiencies.

Burners

There are additional problems associated with the burners used with such boilers. It is well known that conventional or standard burners used in boilers are highly reliable; however they result in significant amount of $NO_x$ production. A boiler with a standard burner typically results in 80-120 ppm of $NO_x$, whereas some environmental limits are below 30 ppm $NO_x$. In states such as California, $NO_x$ emission limits from such industrial and commercial boilers are expected to be reduced to below 5 ppm.

To solve the $NO_x$ emission problem from boilers, boiler industry and users have moved from the use of standard burners to low $NO_x$ and ultra low $NO_x$ burners. While low $NO_x$ and ultra low $NO_x$ burners allow $NO_x$ reductions from burners to less than 30 ppm and below 9 ppm, they are very expensive. Excess fuel is burned to achieve the same efficiency, thereby increasing the total $CO_2$ content in the combusted exhaust. Moreover, these burners require frequent maintenance and are not easy to operate. Boiler and Burner manufacturers and users have gradually accepted the use of low NOx burners even though they are costly, since they result in lower NOx emissions when compared to standard burners. This helps with compliance with emission laws but at the expense of energy costs and lower boiler efficiencies. Use of a low NOx burners results in about 30-60 ppm of NOx. As NOx regulations drive NOx emissions even lower, in most cases below 30 ppm and some cases below 9 ppm, the use of expensive ultra low NOx burners are being recommended. Table 1 presents comparison of various features of different types of burners typically used in industrial and commercial boilers.

TABLE 1

General comparison of various features for boilers using standard, Low NOx and Ultra Low NOx burners

| Feature | Conventional or Standard Burners | Low NOx burners | Ultra Low NOx burners |
| --- | --- | --- | --- |
| Flame Stability | Highly stable | Somewhat stable | Unstable |
| Reliability | Highly reliable | reliable | Unreliable |
| Boiler Turndown efficiency | Excellent (>10:1) | Good to moderate (<6:1) | Poor (<4:1) |
| Cost | Low | Moderate to high | Expensive |
| Excess O2 in flue gas | 1-3% | 3-5% | 3-8% |
| NOx in flue gas | 80-120 ppm with no FGR | 30-60 ppm with 10% FGR | <30-9 ppm with 25-30% FGR |
| Performance | Nameplate efficiency | Some loss of efficiency | 3-20% loss of nameplate efficiency |
| FGR with burner | None or little | 5-15% FGR | 10-35% FGR |
| Maintenance | Low | Moderate | High |
| Steam ramp rate | Fast | Good steam ramp rate | Poor steam ramp rate |
| Thermal Efficiency | High boiler thermal efficiency | Some loss of thermal efficiency | Poor boiler thermal efficiency |

Also problematic, low $NO_x$ and ultra low NOx burners are typically associated with exhaust recirculation (Flue Gas Recirculation hereinafter referred to as "FGR" or Exhaust Gas Recirculation "EGR") of up to 30%. Exhaust is drawn inside by the use of fans, which consume additional power. Typical power consumption can be in the range of 30-40% higher than standard burners.

To sum up, the disadvantages of low and ultra low $NO_x$ burners are: they are expensive, require more fuel, require a large excess of $O_2$ to achieve the same performance as a standard burner, have poor flame stability, have higher FGR, produce more $CO_2$, and require more frequent maintenance.

SCR Catalysts

The present invention utilizes a zeolite based SCR catalyst (defined below) at the back-end of the boiler to reduce the $NO_x$ in the exhaust.

Zeolite based SCR catalysts are used in emission reductions for various stationary power generating equipment such as gas turbines, but have not been used with standard boilers. Most industrial boilers have economizers, to utilize as much heat as possible which would otherwise be wasted. Therefore a SCR catalyst that can perform well at low temperatures is essential for boiler applications. Typical exhaust temperatures at the end of the boiler economizer is in the 400° F. range, where as it could be as high as 600° F. before the economizer. Boiler stack temperatures are usually around 200-350° F.

Conventional SCR catalysts are based on vanadia and/or titania (hereinafter referred to as "Conventional SCR Catalyst"). Imanari, (U.S. Pat. No. 4,833,113, herein incorporated by reference), for example, describes an SCR catalyst comprising an oxide of titanium, an oxide of tungsten, and an oxide of vanadium. Conventional SCR catalysts such as the $V/TiO_2$ and the modified $V/TiO_2$ have their maximum performance in the temperature window of 500 to 800° F. and more preferably in the temperature window of 700 to 800° F. However, industrial and commercial boiler exhausts are a lot colder than that. Therefore there is a strong need for a high performance SCR catalyst that can perform well at all temperatures (300-600° F.) depending on the boiler and economizer installation and which can withstand the stringent boiler exhaust conditions.

Furthermore, the large excess of water vapor (20%), low temperatures of boiler exhaust, and the presence of contaminants such as alkali metals, $SO_2$, etc. (as is known in the art), all degrade the performance of conventional catalysts (including but not limited to conventional SCR catalysts) especially at low temperatures.

Byrne (U.S. Pat. No. 4,961,917, herein incorporated by reference) discloses a method of passing ammonia, nitrogen oxides, and oxygen over iron or copper-promoted zeolite catalysts to selectively catalyze the reduction of $NO_x$. These catalysts in Byrne and the conventional SCR catalysts are specifically excluded from the zeolite based SCR catalysts as defined later in this specification. The fresh copper-promoted catalyst has good activity. However, the copper catalyst deactivates significantly when aged. Although the iron catalyst is far more stable than the copper catalyst, it has maximum activity at about 660-932° F. significantly higher than the required 300-600° F. temperatures that occur in industrial and commercial boilers. There is a strong need for a SCR catalyst that can work well in the temperature window of 300 to 600° F.

Another feature of industrial and commercial boiler exhaust is that it contains about 10 to 20% water vapor and about 1 to 8% $O_2$. The amount of water vapor is higher for boilers that any other stationary sources such as diesel engines, gas turbines, gas engines etc. Also the amount of $O_2$ is lower when compared to such stationary sources. This imposes difficulty on a Conventional SCR Catalyst to perform at such stringent conditions of temperature and exhaust compositions.

Another problem regarding the industrial and commercial boilers is their turn-down feature. Depending on the steam production requirement, industrial and commercial boilers can operate at either a maximum firing condition, at a minimum firing condition or at any firing condition in between. The industrial and/or commercial boiler operation is usually carried out at varying load conditions resulting in vast differences in the temperature of firing conditions during a boiler operation. It is this temperature swing in firing conditions that results in vast temperature differences in the boiler exhaust. Industrial and commercial boilers can typically operate between about 600° F. at maximum firing conditions and below about 400° F. at minimum firing conditions. The amount of exhaust through the boiler also varies as the firing conditions vary. Low firing conditions will result in lower exhaust from the boiler. Higher firing conditions will result in larger amounts of exhaust gases from the boiler. Therefore it is important for the catalyst to have good $NO_x$ conversion activity over the entire range of boiler firing conditions. For a given amount of catalyst volume in a SCR reactor in a boiler stack, this means that the catalyst should operate at lower space velocities at low fire conditions and at higher space velocities at high fire conditions. Space velocity is defined as the volume of the exhaust through the SCR reactor in SCFH (standard cubic feet per hour) divided by the volume of the catalyst in cubic feet. In such a calculation, the units for space velocity are hr−1.

The installation of some types of SCR catalyst (but not zeolite based SCR catalyst) behind industrial and commercial boilers for the purpose of NOx reduction has been commercialized. CRI catalyst company, a division of Shell, presented a paper at the $3^{rd}$ international symposium on incineration and flue gas treatment technologies conducted in July 2001 in Brussels wherein they describe their DeNOx system that contains SCR catalyst for the purpose of NOx reduction. This reactor is located downstream of the boiler, wherein the stack of the boiler is replaced or modified with a SCR reactor. Ammonia is injected before the SCR reactor and the catalyst allows NOx reduction utilizing the reducing agent. One disadvantage of this system is that the temperature in the boiler stack seldom exceeds 400° F. To achieve a great degree of NOx reduction, significant amount of catalyst need to be used. Also when there is a lot of catalyst being used, it creates excessive back pressure due to the presence of the large SCR reactor. Back pressure in a fire tube or a water tube boiler seldom exceed 3 inches of water column pressure. More importantly for fire tube boilers, it is preferred to have back pressure losses around less than one inch of water column.

SUMMARY OF THE INTENTION

The present invention is a more economical, more reliable and energy efficient way of removing $NO_x$ from boiler exhaust. The invention is the use of a boiler with a back-end post combustion emission system using a zeolite based SCR catalyst technology. This system comprises the introduction of a reducing agent into the exhaust from the boiler before or while the exhaust and reducing agent mixture (hereinafter "Mixture') is directed through a zeolite based SCR catalyst. The catalyst is optionally arranged in layers.

A zeolite based SCR catalyst is defined as comprising: a first component comprising at least one of the group consisting of copper, chromium, cobalt, nickel, manganese, iron, niobium, silver, gallium, cadium and mixtures thereof, a second component comprising at least one of the group consisting of cerium, a lanthanide, a mixtures of lanthanides, and mixtures thereof, a zeolite, and a one oxygen storage material. Lanthanides (or "Lan") are defined to mean Y, La, Pr, Nd, Sm, Eu, Gd, Ho or Yb.

Optionally, embodiments may include one or more economizers. The zeolite based SCR catalyst may be located in the economizer, upstream or downstream of the economizer.

Using the zeolite based SCR catalyst will allow the user to avoid high cost, high maintenance low $NO_x$ and/or ultra low $NO_x$ burners. A standard burner can be used instead in combination with this zeolite based SCR catalyst. Such a combination will result in reducing any amount of $NO_x$ to almost negligible amounts, upon dosage of stoichiometric amounts of reducing agents, e.g. without limitation ammonia. Not only are emission reductions achieved, but due to the use of a standard burner in combination with this zeolite based SCR catalyst, one can also achieve efficiency benefits, energy savings and cost savings. In situations where the boiler already has a low NOx burner and is required to even further lower NOx emissions than the low NOx burner can achieve, (below 30 ppm NOx for example), the zeolite-based SCR catalyst will allow such NOx reductions in addition to efficiency benefits, energy savings and cost savings compared to an ultra low NOx burner without a zeolite based SCR catalyst. In situations where the boiler already has an ultra low NOx burner generating 9 ppm NOx, and regulations force to be below the levels attained by the ultra low NOx burners, the zeolite based SCR catalyst will allow such NOx reductions.

A zeolite based SCR catalyst can work well in such low to medium temperatures (about 300-about 600° F.) seen in the exhaust of such boilers using reducing agents (preferably, without limitation ammonia) for the purpose of $NO_x$ reduction. This catalyst is capable of trimming $NO_x$ levels to below 5 ppm levels, in the temperature range of about 300-about 600° F. when the Mixture is directed through it after exiting from a boiler.

The reducing agent used may be any known reducing agent or combination of reducing agents for reducing $NO_x$, preferably, without limitation, ammonia. Ammonia can be introduced into the exhaust by any known method. Ammonia can be generated from anhydrous ammonia, aqueous ammonia, ammonium hydroxide, ammonium formate, urea or any compound capable of generating ammonia from it. Other known methods of forming ammonia in front of the zeolite based SCR catalyst may also be used accordingly. For example without limitation, a hydrocarbon (e.g. without limitation ethanol) in combination with a suitable catalyst can be used upstream of the zeolite based catalyst for the purpose of generating ammonia for $NO_x$ reduction. In such a situation, ammonia is generated by the reaction of the hydrocarbon with the exhaust on the suitable catalyst site. A typical catalyst generating ammonia from ethanol in a exhaust stream can be a silver based catalyst (See U.S. Pat. No. 6,284,211 incorporated herein by reference).

In a typical boiler installation in the prior art, with the standard burner, there is about 80-120 ppm NOx in the exhaust. In the prior art, this can be trimmed down to 40-60 ppm $NO_x$ by the use of 10% FGR, unlike the case of an ultra low $NO_x$ burner (where 30% FGR is required).

By using a standard burner, the invention largely eliminates all disadvantages associated with low $NO_x$ and ultra low $NO_x$ burners set forth in the Background section. It is also possible to reap certain benefits by choosing a low $NO_x$ burner with a zeolite based SCR catalyst system in comparison to an ultra low $NO_x$ burner without a zeolite based SCR catalyst system for $NO_x$ reductions.

Installing a reactor with a zeolite-based SCR catalyst and introducing the reducing agent before, in or after the economizer allows greater than 90% $NO_x$ conversion. Thus $NO_x$ can be trimmed down to single digit numbers.

The present invention selectively reduces $NO_x$ in an exhaust by contacting the exhaust with a reducing agent and placing the Mixture in the presence of a catalyst with a first component comprising at least one of the group consisting of copper, chromium, cobalt, nickel, manganese, iron, niobium, silver, gallium, cadium and mixtures thereof; a second component comprising at least one of the group consisting of cerium, a lanthanide, a mixture of lanthanides, and mixtures thereof; least one oxygen storage material; and at least one zeolite.

In one embodiment, a zeolite based SCR catalyst comprises a first component comprising at least one of the group consisting of copper, chromium, cobalt, nickel, manganese, iron, niobium, silver, gallium, cadium and mixtures thereof; a second component comprising at least one of the group consisting of cerium, a lanthanide, a mixture of lanthanides, and mixtures thereof; and at least one zeolite and at least one oxygen storage material.

FIGURES

FIG. 1 shows a plot of $NO_x$ conversion on the primary Y-axis versus temperature on the X-axis. Also shown on the secondary Y-axis is $NH_3$ slip as a function of temperature on the x-axis. Data was collected at various space velocities ranging from 5000 hr−1 to 40,000 hr−1.

DETAILED DESCRIPTION

Figure 1:
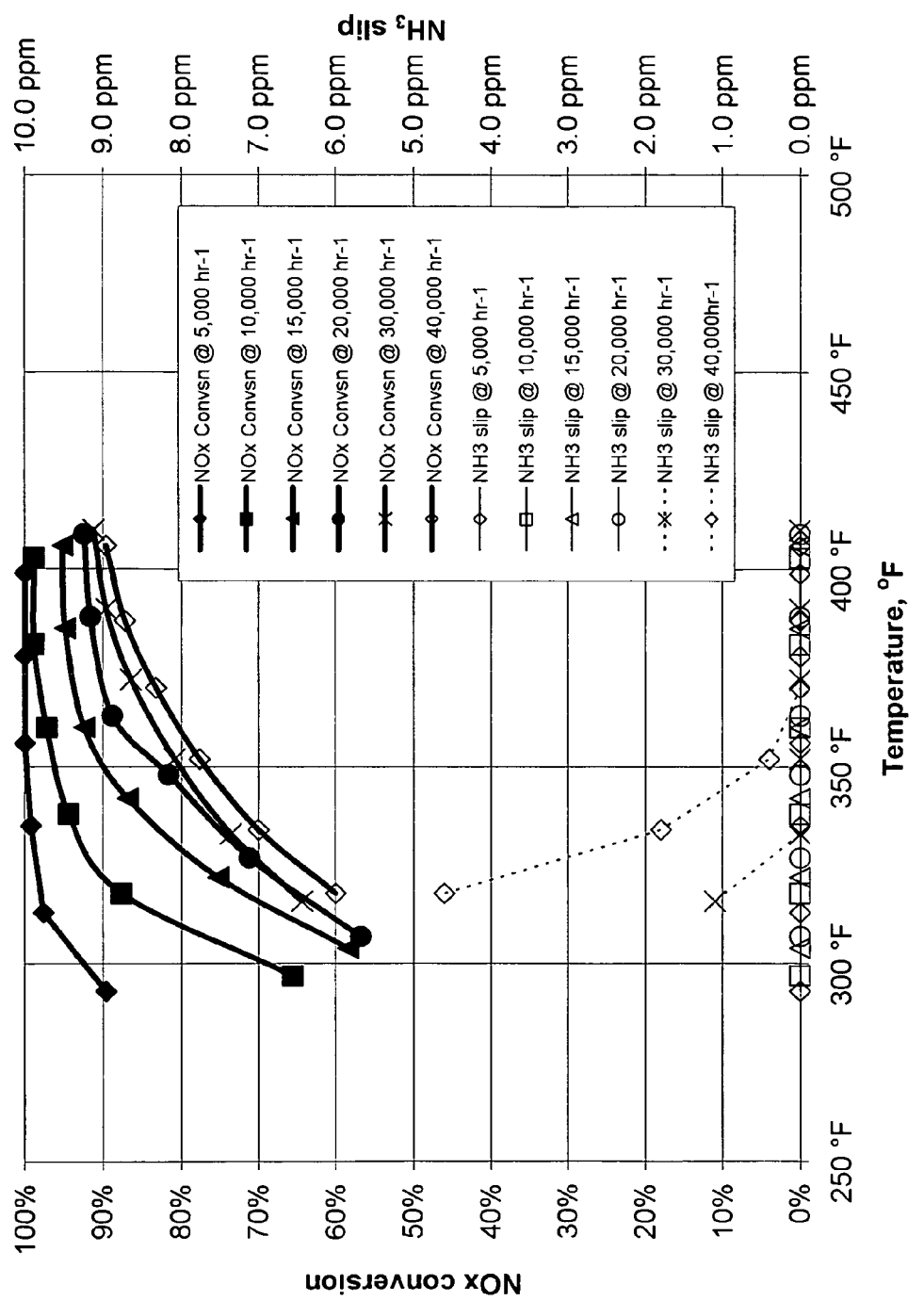

Exhaust from industrial and commercial boilers contains nitrogen oxides. It contains low excess oxygen (typically about 1 to about 10%) and high amounts of water vapor (about 20%). The nitrogen oxides in the exhaust can be removed by contacting the exhaust with reducing agents such as, without limitation, ammonia in the presence of a zeolite based SCR catalyst. The reducing agent reacts with the nitrogen oxides to form nitrogen and water.

Water vapor in the exhaust can deactivate the catalyst, lowering the $NO_x$ conversion. However, under the boiler conditions, the zeolite based SCR catalyst appears to have little or no deactivity from the water vapor. Industrial and commercial boilers typically have about 20% water vapor.

The exhaust from industrial and commercial boilers is at low temperature, about 300-about 600° F. Low temperature activity of the SCR catalyst is therefore important for industrial and commercial boiler applications. The zeolite based SCR catalysts according to embodiments of the present invention have good $NO_x$ conversion activity at low temperatures.

Sulfur although present at low levels in natural gas used as fuel in boilers may impact the SCR catalyst performance significantly at low temperatures. In 2006 and 2007 natural gas produced by PG&E had a total maximum sulfur level of 15 ppm. Cleaver-Brooks emissions guide (incorporated herein by reference) teaches that sulfur present in the exhaust of industrial and commercial boilers is around 0.34 ppm. The reactor system with a zeolite based SCR catalyst according to the present invention has good $NO_x$ conversion activity at low temperatures even in the presence of sulfur and large excess water vapor.

According to Alcorn (U.S. Pat. No. 4,912,776 hereby incorporated by reference), it is believed that the reduction of NO requires the presence of oxygen, while the reduction of $NO_2$ does not. Alcorn also asserts that the reduction of $NO_2$ is easier to carry out than the reduction of NO. Boiler exhaust has both NO and $NO_2$ collectively termed as $NO_x$. The NO component in $NO_x$ can be in the range of about 90-about 100% in the exhaust of industrial and commercial boilers.

Alcorn states that the evidence seems to support a two-step process for the SCR process, where the following reactions occur in parallel:

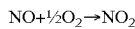

$$NO + \tfrac{1}{2}O_2 \rightarrow NO_2$$

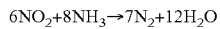

$$6NO_2 + 8NH_3 \rightarrow 7N_2 + 12H_2O$$

It is well-known that SCR catalysts have lower activity for $NO_x$ conversion at high $NO/NO_2$ ratios than at low ratios. Only about 10% of the $NO_x$ in boiler offgas is $NO_2$. Low temperature activity of the SCR catalyst at high $NO/NO_2$ ratios is therefore an important factor. Zeolite based SCR catalysts perform better. Without being limited to mechanism, it is believed that the first and second components along with the zeolite and OSM allow conversion of NO to NO2 especially at lower temperatures as a first step in the process of reducing NOx. As more NO2 is formed, NO/NO2 ratio reduces when compared to an untreated boiler exhaust. NO2 is more readily reduced than NO. Therefore lower temperature activity is improved with the zeolite based SCR catalyst.

The zeolite based SCR catalysts according to embodiments of the present invention have higher activity at low temperatures than the catalysts of the prior art. The zeolite based SCR catalysts of the present invention also have higher hydrothermal stability than the catalysts of the prior art. Boiler exhaust normally contains a significant amount of water. Hydrothermal stability is therefore a major factor for these boiler applications.

Zeolite Based SCR Catalyst

The first component and the second component of the zeolite-base SCR catalysts may have a synergistic effect on one another. The synergistic effect may help to provide high $NO_x$ conversion at low temperatures. The synergy between the first component and the second component may also help to stabilize the zeolite based SCR catalysts toward hydrothermal aging and sulfur aging.

First Component

The first component of the zeolite based SCR catalyst comprises at least one of copper, chromium, cobalt, nickel, manganese, iron, niobium, silver, gallium, cadium and mixtures thereof, preferably manganese and/or copper.

The zeolite based SCR catalyst of the present invention may comprise about 1 to about 20 weight percent of the first component, more preferably about 3 to about 15 weight percent of the first component, and most preferably about 5 to about 8 weight percent of the first component, where the weight percent of the first component is calculated on the basis of the metal.

Second Component

The second component of the zeolite based SCR catalyst comprises at least one component selected from the group consisting of cerium, a lanthanide, a mixture of lanthanides, and mixtures thereof, preferably cerium.

The zeolite based SCR catalyst of the present invention may comprise about 2 to about 50 weight percent of the second component, more preferably about 5 to about 30 weight percent of the second component, and most preferably about 5 to about 25 weight percent of the second component, where the weight percentage of the second component is calculated on the basis of the metal.

Zeolite

The zeolite based SCR catalyst comprises at least one zeolite. The zeolite may be selected from the group consisting of ZSM-5, ZSM-11, ZSM-12, ZSM-18, ZSM-23, zeolite beta, a ZSM-type zeolite, a MCM-type zeolite, mordenite, faujasite, ferrierite, and mixtures thereof, preferably ZSM-5.

The zeolite may be in the H-form, the Na-form, the ammonium-form, or mixtures thereof, preferably the H-form of the zeolite.

The zeolite may also be ion-exchanged, all or in part, with the first component and/or the second component. The $SiO_2/Al_2O_3$ ratio of the zeolite may be in a range of about 1 to about 500, more preferably about 10 to about 150, and most preferably about 30 to about 70 (preferably about 40). Although not wishing to be bound by a theory, it is believed that zeolites having a $SiO_2/Al_2O_3$ ratio greater than about 10 may be beneficial in enhancing the hydrothermal stability of the catalysts.

In an embodiment, all or part of the first component, second component, or both the first component and the second component may be impregnated or ion-exchanged into the zeolite or mixture of zeolites. In an embodiment, part of the first component and/or the second component may be ion-exchanged into the zeolite or mixture of zeolites, and part of the first component and/or the second component may be impregnated into the zeolite or mixture of zeolites.

The zeolite based SCR catalyst may comprise about 10 to 90 weight percent zeolite, more preferably about 20 to about 90 weight percent zeolite, and most preferably about 40 to about 80 weight percent zeolite.

Oxygen Storage Material

The zeolite based SCR catalyst comprises at least one oxygen storage material. Oxygen storage materials may comprise a cerium-oxide-based material. Oxygen storage materials can take up oxygen from oxygen-rich feed streams and give up oxygen to oxygen-deficient feedstreams. The oxygen storage material may also be used as a support for the first component and/or the second component.

The total surface area of cerium oxide-based materials may generally decreased when the cerium oxide-based materials are heated to temperatures of about 800° C. or more. One or more metal oxides may be added to the cerium oxide-based material to decrease the degree of sintering of the cerium oxide-based material during exposure to high temperatures. The preferred metal oxides that can be added to the cerium oxide-based materials may be, for example, one or more of $ZrO_2$, $Al_2O_3$, $La_2O_3$, or other rare earth metal oxide. Rare earth metals are defined as scandium and yttrium and the elements with atomic numbers 57 through 71. In one embodiment of the present invention, the oxygen storage material may be a cerium oxide-based material having a composition with the formula $Ce_{1-a}Zr_aO_2$ or $Ce_{1-c-d}Zr_cLan_dO_2$.

In another embodiment, the oxygen storage material may have a formula of $Ce_{0.24}Zr_{0.66}La_{0.04}Y_{0.06}O_2$ (CZLY), $Ce_{0.24}Zr_{0.67}Ln_{0.09}O_2$ (CZL), $Ce_{0.68}Zr_{0.32}O_2$ (CZO), $Ce_{0.24}Zr_{0.67}Nd_{0.09}O_2$ (CZN) or $Ce_{0.6}Zr_{0.3}Nd_{0.05}Pr_{0.05}O_2$ (CZNP). Other oxygen storage materials may also be suitable.

The zeolite based SCR catalyst comprises about 10 to about 90 weight percent oxygen storage material, more preferably about 20 to about 70 weight percent oxygen storage material, and most preferably about 30 to about 60 weight percent oxygen storage material. The weight percent of the oxygen storage material is on the basis of the oxides.

Although not wishing to be limited to a theory, it is believed that the oxygen storage material may enhance the performance of the zeolite based SCR catalysts by improving its ability to oxidize NO to $NO_2$. $NO_2$ may react more rapidly with ammonia or other reducing agent than does NO. Enhancing the ability of the catalyst to oxidize NO to $NO_2$ may therefore improve the activity of the catalyst to catalyze the selective reduction of $NO_x$ with ammonia. The oxygen storage material may also improve the rheology of aqueous slurries for the optional washcoat (described below) that comprise the oxygen storage material.

Inorganic Oxides

The zeolite based SCR catalyst may also comprise at least one inorganic oxide selected from the group consisting of alumina, silica, titania, silica-alumina, zirconia, and composites, and mixtures thereof, preferably alumina. The inorganic oxides may be used, for example, as part of a washcoat.

In an embodiment, the sum of the amount of oxygen storage material and the amount of inorganic oxide may be an amount as previously given for the oxygen storage material alone. The other inorganic oxides may be substituted, all or in part, for the oxygen storage material, although the inorganic oxides may have a different function than the oxygen storage material. Inorganic oxides may improve the rheology of aqueous slurries for the optional washcoat and enhance wash-coat adhesion to a substrate, if the catalyst is to be coated on a monolith.

Zeolite Based SCR Catalyst Composition

The zeolite based SCR catalyst may comprise a substrate. As used herein, a substrate may be any support structure known in the art for supporting catalysts. In one embodiment of the present invention, the substrate may be in the form of beads or pellets or an extrudate. The beads or pellets may be formed from alumina, silica alumina, silica, titania, mixtures thereof, or any suitable material. In another embodiment of the present invention, the substrate may be a honeycomb support. The honeycomb support may be a ceramic honeycomb support or a metal honeycomb support. The ceramic honeycomb support may be formed, for example, from sillimanite, zirconia, petalite, spodumene, magnesium silicates, mullite, alumina, cordierite ($Mg_2Al_4Si_5O_{18}$), other aluminosilicate materials, silicon carbide, or combinations thereof. Other ceramic supports may also be suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, the substrate, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust catalysts. They may differ from the honeycomb substrates that may be used to form normal automobile exhaust catalysts in that the channels of the wall flow filter may be alternately plugged at an inlet and an outlet so that the exhaust is forced to flow through the porous walls of the wall flow filter while traveling from the inlet to the outlet of the wall flow filter.

Washcoat

In an embodiment, at least a portion of the catalyst of the present invention may be placed on the substrate in the form of a washcoat.

In an embodiment, a washcoat may be formed on the substrate by suspending the zeolite and/or OSM in water to form an aqueous slurry and placing (placing includes but is not limited to depositing, adhering, curing, dipping, applying, and spraying) the aqueous slurry onto the substrate as a washcoat. In an another embodiment, the washcoat may further comprise at least one inorganic oxide selected from the group consisting of alumina, silica, titania, silica-alumina, zirconia and solid solutions, and combinations thereof.

In other embodiments, other components such as salts of the first and/or the second components may optionally be added to the aqueous slurry. Other components such as acid or base solutions or various salts or organic compounds may be added to the aqueous slurry to adjust the rheology of the slurry. Some examples of compounds that can be used to adjust the rheology include, but are not limited to ammonium hydroxide, aluminum hydroxide, acetic acid, citric acid, tetraethylammonium hydroxide, other tetralkylammonium salts, ammonium acetate, ammonium citrate, glycerol, commercial polymers such as polyethylene glycol, and other suitable polymers.

In an embodiment, the first component, the second component, or both the first component and the second component may be added to the aqueous slurry as oxides or other compounds, for example nitrates, acetates or other salts and/or mixture of thereof. The slurry may be placed onto the substrate in any suitable manner. If the substrate is a monolithic carrier with parallel flow passages, the washcoat may be formed on the walls of the passages. Gas flowing through the flow passages may contact the washcoat on the walls of the passages as well as materials that are supported on the washcoat.

It is believed that the oxygen storage material may enhance the rheology of the washcoat slurry. The enhanced rheology of the washcoat slurry that may be due to the presence of the oxygen storage material may enhance the adhesion of the washcoat slurry to the substrate.

In an embodiment, a washcoat may be formed by slurry depositing the zeolite and the oxygen storage material onto the substrate. The washcoat may also comprise at least one inorganic oxide selected from the group consisting of alumina, silica, titania, silica-alumina, zirconia and solid solutions, composites, and mixtures thereof. A solution comprising water-soluble precursor salts of the first component and/or the second component may be impregnated and/or ion-exchanged into the washcoat after the washcoat is placed on the substrate. In an alternative embodiment, salts of the first and/or the second component may be added to the aqueous slurry for the washcoat. In yet another embodiment, at least one of the first component, and the second component, may be added to the aqueous slurry for the washcoat as oxides.

In an embodiment, the substrate, the washcoat, and the impregnated or ion-exchanged solution (comprising water-soluble precursor salts of the first component and/or the second component) may be calcined to form the catalyst composition before or after the washcoat and/or the solution are added to the substrate. In an embodiment, the washcoat and the impregnated or ion-exchanged solution may be dried before calcining.

Catalyst Cassette and Zeolite Based SCR Catalyst Reactor

Figure 4:
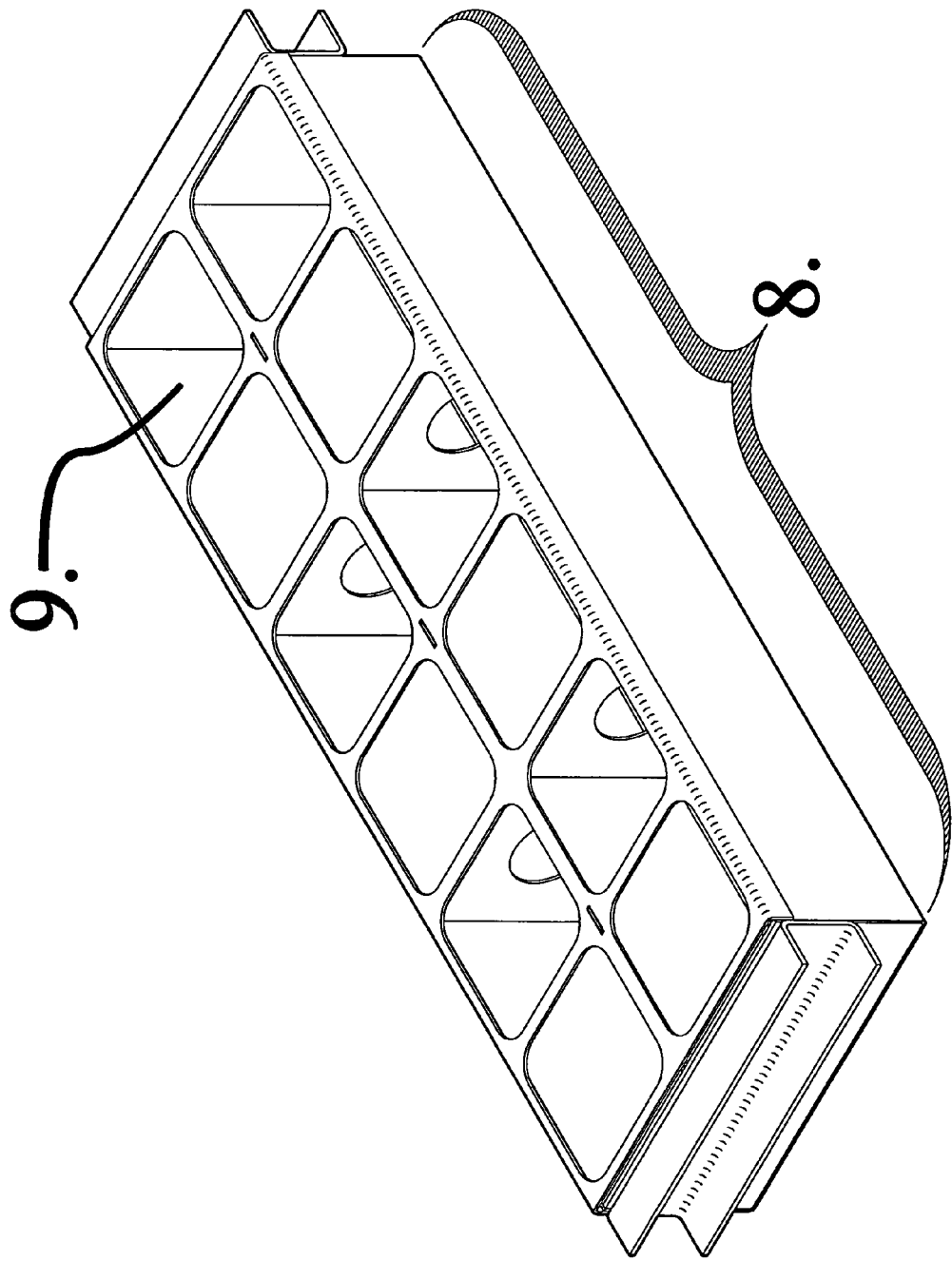
FIG. 4 shows one embodiment of a cassette.

In a preferred embodiment, the honeycomb catalysts (preferably coated and calcined) can be formed into a catalyst cassette. In one embodiment as shown in FIG. 4, the individual honeycomb catalysts that form the catalyst cassette (8) are called as catalysts elements which are held in spaces (9) within the cassette. The dimensions of the catalyst cassette can be from one or more catalyst elements depending on the boiler exhaust requirements and reactor space requirements. Several cassettes may be used adjacent to or stacked on each other within a layer. The layers may be modular so that multiple layers may be used in the reactor but one or more layer can be removed and/or replaced at a time. The cassettes may be modular as well so multiple cassettes may be used in each layer but one or more cassette can be removed and/or replaced at a time. In some embodiments, the removal, replacement and/or repair of one or more cassettes and/or one or more layers may be conducted while the boiler is operating. The reactor may be built so that one or more of the cassettes and/or layers may be accessed, removed, added and/or replaced without dismantling the entire reactor (e.g. as modular units).

The depth of the zeolite based SCR catalyst layer can be anywhere from 3 to 120" depending on performance and pressure drop requirements. More preferably the depth of zeolite based SCR catalyst can be from 3" to 36". One or more layers may be used in the reactor in series or adjacent to each other. If needed, the SCR catalyst cassettes can be easily removed and stored at site when the boiler is not operational. The cassettes comprise one or more catalyst elements that are either 12" or 6" or 3" thick. Typical cross-section of each catalyst element can be but not limited to 6"×6". The catalyst element is typically a coated honeycomb substrate with anywhere from 10-800 cells per square inch. The catalyst element can be extruded into any shape. For example, the catalyst can be extruded into a honeycomb of suitable size and cassettes may be formed from such an extruded honeycomb. Beads or pellets can be made from such a zeolite based SCR catalyst and can be packed to form a zeolite SCR catalyst into a cassette.

In one embodiment, the reactor is arranged such that the flow of the exhaust is substantially perpendicular to the catalyst cassettes. The reactor can be located either horizontally or vertically or in any direction as dictated by the application needs. In an embodiment, the reactor can be located in the boiler stack or any place in the path of the exhaust.

In an example, a catalyst cassette dimension is 1 feet wide×8 feet long×0.5 feet deep. The catalyst cassettes can be contained in a container that forms the zeolite based SCR catalyst reactor. A zeolite based SCR catalyst reactor can have several catalyst cassettes. The amount of the catalyst is dictated by the dimensions of the zeolite based SCR reactor that is required to reduce emissions from the boiler exhaust. Although the number of catalyst cassettes are not limited for any boiler, for a typical boiler application, preferably 2 or 3 catalyst cassettes are used. This modularized approach will allow ease of installation and ease of replacement. Also, the catalyst cassettes can be removed easily and stored appropriately when the boiler is not under operation. Additional layers of catalyst cassettes can be added in the future, as catalyst activity decreases over time, to extend the lifetime of the performance of the existing system, or to lower $NO_x$ emissions to meet new regulatory requirements.

Figure 2:
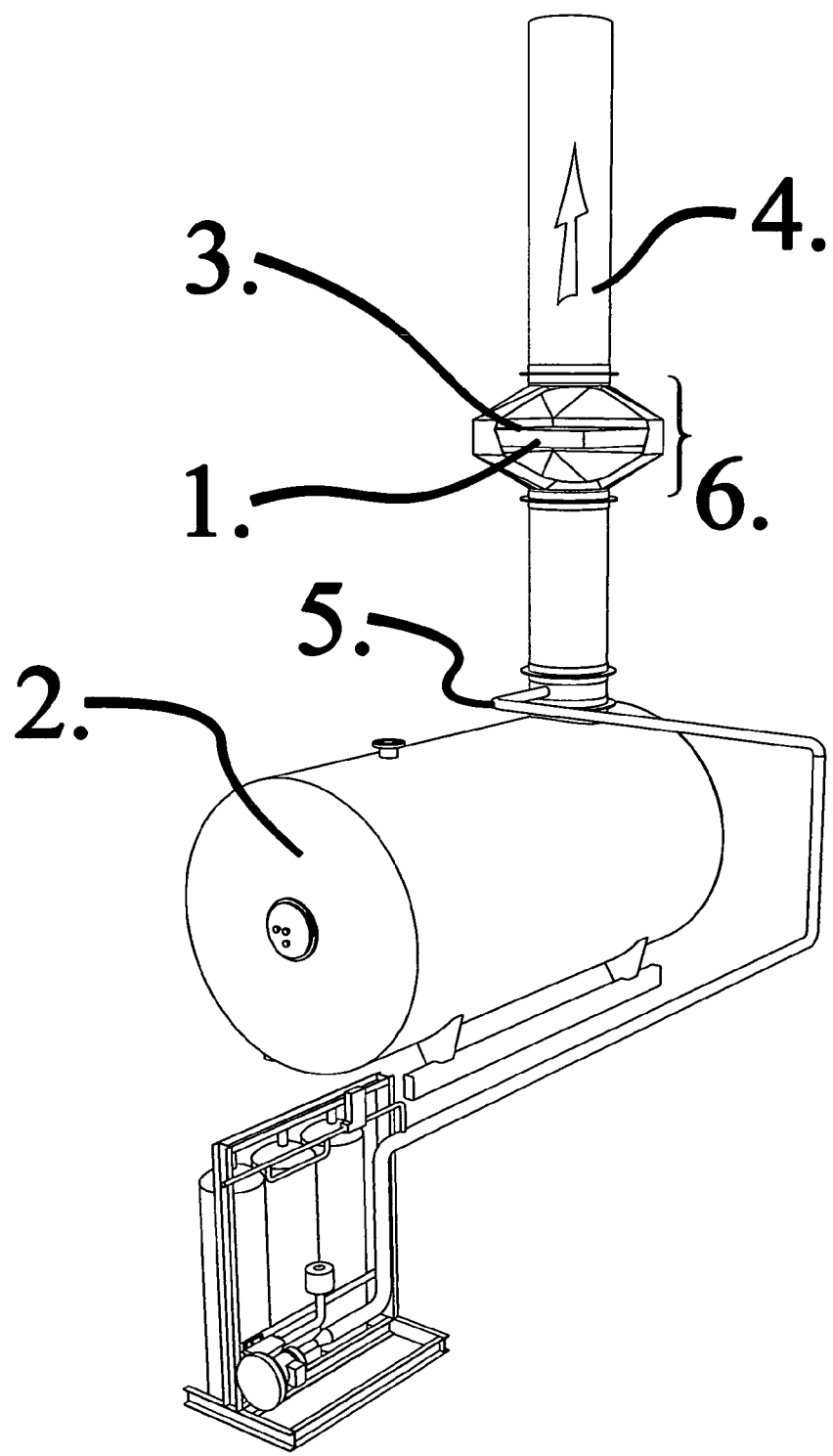
FIG. 2 shows one embodiment of the invention as used with a fire tube boiler.

In one embodiment shown in FIG. 2, the zeolite-based SCR catalyst (1) is used with a fire tube boiler (2). The reactor (6) which contains the zeolite-based SCR catalyst (1) is located in the stack (4) and the reducing agent is injected into the exhaust (5) before the exhaust reaches the zeolite-based SCR catalyst. The zeolite-based SCR catalyst is formed into cassettes (3) and multiple cassettes and/or multiple layers may be used in a single reactor. This helps so that if one cassette needs to be replaced, the entire catalyst does not have to be removed. The reactor may be built so that one or more of the cassettes and/or layers may be accessed, removed, added and/or replaced without dismantling the entire reactor (e.g. as modular units).

Figure 3:
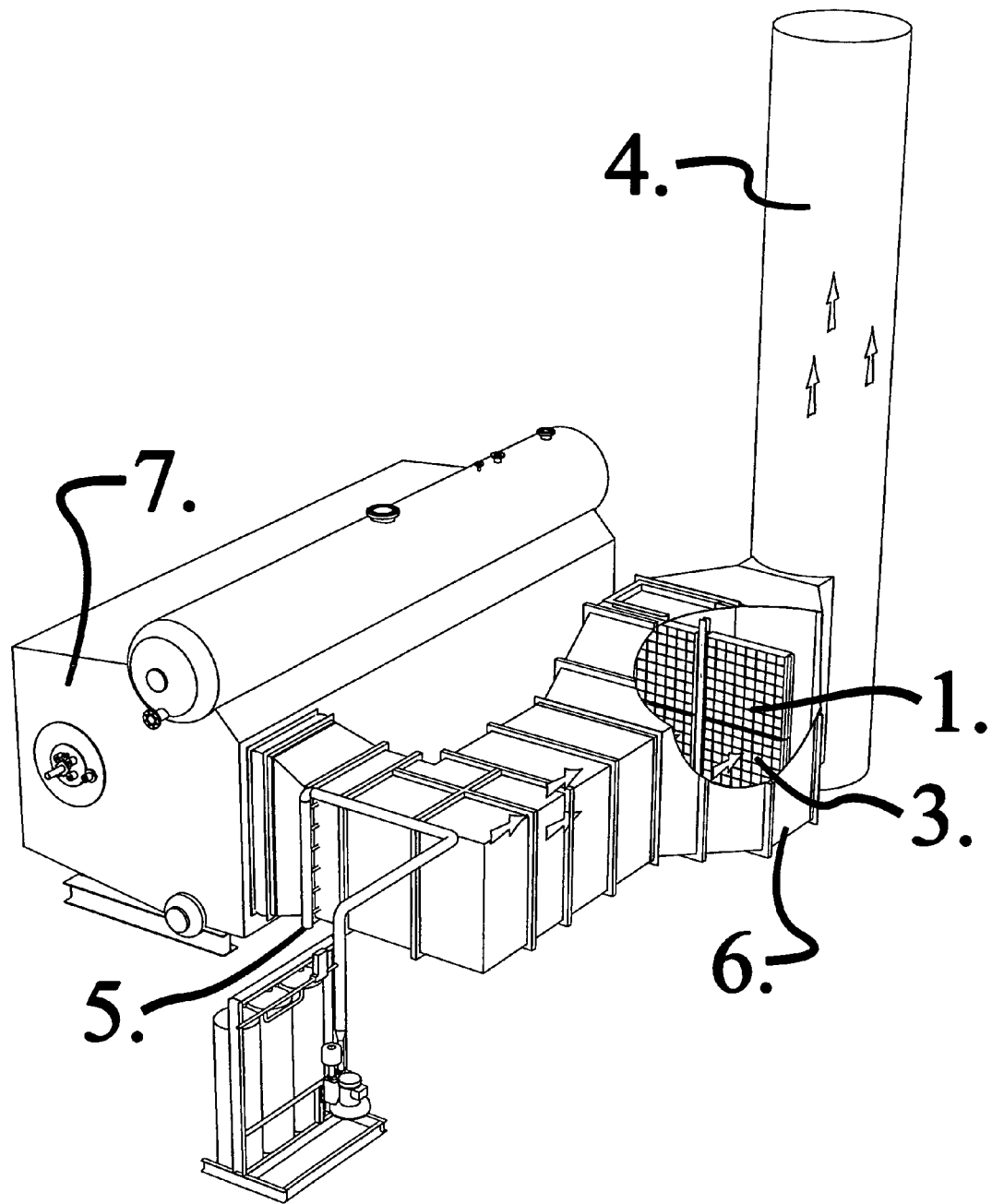
FIG. 3 shows one embodiment of the invention as used with a water tube boiler.

In another embodiment shown in FIG. 3, the zeolite-based SCR catalyst (1) is used with a water tube boiler (7). The reactor (6) which contains the zeolite-based SCR catalyst (1) is located after the boiler (7) but before the stack (4) and the reducing agent is injected into the exhaust (5) before the exhaust reaches the zeolite-based SCR catalyst. The zeolite-based SCR catalyst is formed into cassettes (3) and multiple cassettes and/or multiple layers may be used in a single reactor. This helps so that if one cassette needs to be replaced, the entire catalyst does not have to be removed.

Method for Removing $NO_x$

In an embodiment, the exhaust from a boiler contacts the zeolite based SCR catalyst in the presence of a reducing agent, preferably ammonia sufficient to reduce the $NO_x$ that is contained in the boiler exhaust to the desired level. The reducing agent may be introduced into the exhaust before the exhaust contacts the zeolite based SCR catalyst or at the time that the exhaust contacts the zeolite based SCR catalyst. Static mixers, flow deflecting vanes and/or other devices may be used to mix the reducing agent with the exhaust before or when it reaches the zeolite based SCR catalyst reactor. The zeolite based SCR catalyst can be located anywhere from the boiler exit to the end of the boiler stack. In an embodiment, the zeolite based SCR catalyst is located in the boiler stack. In another embodiment, the zeolite based SCR catalyst is located in an economizer. In another embodiment, the zeolite based SCR catalyst is located after the economizer. In another embodiment, the zeolite based SCR catalyst is located before the boiler economizer. The boiler exit breach, the economizer, the stack, and any connecting duct work, or any of combinations thereof can be modified to locate the zeolite based SCR catalyst and more than one location may be used in a single embodiment.

In an embodiment, the ammonia/$NO_x$ mole ratio may be in a range of about 0.01 to about 2.5, more preferably in a range of about 0.7 to about 2, and most preferably in a range of about 0.8 to about 1.2. Low ammonia/$NO_x$ ratios may generally be preferred in order to minimize excess ammonia in the exhaust. Excess ammonia in the exhaust may be undesirable due to health or odor issues.

The space velocity of the exhaust and the reducing agent passing through the zeolite based SCR catalyst may be in a range of about 1,000 $hr^{-1}$ to about 180,000 $hr^{-1}$, more preferably in a range of about 1,000 $hr^{-1}$ to about 90,000 $hr^{-1}$, and most preferably in a range of about 1,000 $hr^{-1}$ to about 60,000 $hr^{-1}$.

The exhaust and reducing agent may be contacted with the zeolite based SCR catalyst at about 140° C. to about 700° C., more preferably at about 150° C. to about 600° C., and most preferably at about 150° C. to about 500° C.

If the temperature of the exhaust is lower than about 150° C., the reduction of the nitrogen oxides may be low. At temperatures greater than about 500° C., the ammonia may be oxidized. If the ammonia is oxidized, there may be insufficient ammonia reducing agent in the exhaust to reduce the nitrogen oxides.

If excess ammonia is present in the exhaust, at least a portion of the excess ammonia may be oxidized to nitrogen by the catalyst according to embodiments of the present invention.

The following examples are intended to illustrate, but not to limit, the scope of the invention. It is to be understood that other procedures known to those skilled in the art may alternatively be used.

Example 1

$NO_x$ Conversion and $NH_3$ Slip at Various Space Velocities

A slurry was made comprising of 50% HZSM-5 zeolite and 50% oxygen storage material with water. This formed the washcoat. This washcoat was coated on a 210 cpsi ceramic honeycomb substrate to achieve a loading of 200 grams per liter of the washcoat on the ceramic honeycomb 210 cpsi substrate. The channels of the wet washcoated substrate were cleared by blowing air using an air knife. The washcoated substrate was fired at 550° C. for 4 hours to get a calcined washcoated substrate. A solution mixture of cerium nitrate, manganese nitrate and copper nitrate was made and impregnated on to the washcoated honeycomb substrate. The solution of cerium nitrate, manganese nitrate and copper nitrate was made such that it will result in a cerium loading of 20 grams per liter, manganese loading of 12.5 grams per liter and copper loading of 5.25 grams per liter on the final impregnated honeycomb catalyst. This catalyst was tested at boiler exhaust conditions using a stream of 40 ppm $NO_x$, 40 ppm $NH_3$, 50 ppm CO, 10% $CO_2$, 20% $H_2O$ and balance $N_2$. The results in terms of $NO_x$ conversion and $NH_3$ slip are presented in Table 2 as a function of space velocity at 350° F. (176.6° C.)

TABLE 2

$NO_x$ conversion and $NH_3$ slip using zeolite based SCR catalyst at boiler exhaust conditions at 350° F.

| Space Velocity, hr-1 | $NO_x$ conversion, % | $NH_3$ slip, PPM |
|---|---|---|
| 5000 | 100 | 0 |
| 10,000 | 97 | 0 |
| 20,000 | 88.8 | 0 |
| 30,000 | 86.4 | 0 |
| 40,000 | 83.2 | 0.4 |

As shown in FIG. 1 and Table 2, NOx conversions in excess of 90% were achieved using this catalyst when the temperature is above 350° F. and when the space velocity was below 15,000 hr-1. As the space velocity increased from 15,000 hr-1 to 40,000 hr-1, NOx conversion decreased from more than 90% to more than 75%. An ammonia slip of greater than 0.2 ppm was observed only when the temperature was below 350° F. and when the space velocity was above or equal to 40,000 hr-1. Most industrial and commercial boilers have exhaust temperatures above 350° F.

Table 3 shows the results of activity tests performed using the catalyst described in Example 1 at boiler exhaust conditions. The stream used to test the catalyst activity was again 40 ppm $NO_x$, 40 ppm $NH_3$, 50 ppm CO, 10% $CO_2$, 20% $H_2O$ and balance $N_2$. A "Pass/Fail" criteria was used to determine the catalyst activity. A "Pass" to the activity test was assigned when the observed $NO_x$ conversion and $NH_3$ slip after the catalyst were less than 5 ppm $NO_x$ and less than 5 ppm $NH_3$. The "Pass" criteria is such that both $NO_x$ and $NH_3$ slip should independently be less than 5 ppm. In other words, if the activity test resulted in 6 ppm $NO_x$ and 2 ppm $NH_3$ slip, or if in an another test $NO_x$ was 2 ppm, however $NH_3$ slip was 6 ppm, the test result in both cases is assigned as "fail".

TABLE 3

Pass or fail result on activity test based on activity test criteria
Activity test criteria: Post catalyst $NO_x$ and $NH_3$ should be less than 5 ppm.

| Space Velocity, hr-1 | Temperature, ° F. | | | | | |
|---|---|---|---|---|---|---|
| | 275 | 300 | 325 | 350 | 375 | 400 |
| 5,000 | Fail | Pass | Pass | Pass | Pass | Pass |
| 10,000 | Fail | Fail | Pass | Pass | Pass | Pass |
| 15,000 | Fail | Fail | Fail | Pass | Pass | Pass |
| 20,000 | Fail | Fail | Fail | Pass | Pass | Pass |
| 30,000, | Fail | Fail | Fail | Fail | Pass | Pass |
| 40,000 | Fail | Fail | Fail | Fail | Fail | Pass |

Example 2

$NO_x$ Conversion and $NH_3$ Slip at Various Temperatures and Space Velocities on Sulfur Aged Catalyst Boiler exhaust may contain sulfur compounds primarily as $SO_2$. The amount of $SO_2$ in a boiler exhaust depends on the type of fuel being burnt in the boiler. Pipeline natural gas is a common fuel for industrial and commercial boilers. Natural gas suppliers such as PG&E provide information of the amount of sulfur present in natural gas. In the years or 2006 and 2007, PG&E provided pipeline natural gas that had total maximum sulfur anywhere from 3 ppm to 15 ppm. Cleaver Brooks, a manufacturer of industrial and commercial boilers, published emissions reference guide that mentions that such a sulfur containing natural gas when burnt in industrial and commercial boilers will result in a $SO_2$ concentration of about 0.34 ppm in the boiler exhaust. Tests were performed using the catalyst described in example 1 and subjecting the catalyst to a sulfur aging using a stream comprising of 1 ppm of $SO_2$ in addition to 20% $H_2O$, 40 ppm $NO_x$, 40 ppm $NH_3$, 50 ppm CO, 10% $CO_2$ and balance $N_2$. Activity data was collected at various space velocities and temperatures after subjecting the catalyst to the above mentioned sulfur aging for 100 hours. Table 4 describes the results obtained after such sulfur aging at 200° C. (392° F.).

TABLE 4

Performance of Zeolite based SCR catalyst after 100 hours of time-on-stream aging with 1 ppm SO2.

| Space Velocity, hr-1 | Temperature, ° F. | Post catalyst $NO_x$ and $NH_3$ slip in ppm | |
|---|---|---|---|
| | | $NO_x$, ppm | $NH_3$ slip, ppm |
| 10,000 | 400 | 5 | 5 |
| 30,000 | 500 | 3 | 3 |
| 30,000 | 600 | 1 | 1 |

The zeolite based SCR catalysts have higher activity for selective reduction of $NO_x$ with ammonia than the catalysts of the prior art. Further, the catalysts according to embodiments of the present invention have high $NO_x$ conversion activity at various temperatures even after subjecting the catalyst with time-on-stream $SO_2$ aging.

The zeolite based SCR catalysts although suitable for industrial and commercial boilers, may have applications to other gas streams that contain $NO_x$, particularly to exhaust streams with either low temperatures or when there is a vast temperature changes during the operation of the application. Some examples of such applications include, but are not limited to, exhaust from diesel engine powered vehicles, exhaust from gas turbines, exhaust from diesel generators, exhaust from electrical generation plants, exhaust from chemical plants, and other suitable applications.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A reactor system comprising:
   A boiler, and
   A zeolite based SCR catalyst, wherein the boiler is upstream of the catalyst, and
   wherein the catalyst comprises (a) a first component selected from the group consisting of copper, chromium, cobalt, nickel, manganese, iron, niobium, gallium, cadmium and mixtures thereof; (b) a second component selected from the group consisting of cerium, a lanthanide, a mixture of lanthanides, and mixtures thereof; (c) a zeolite; and (d) an oxygen storage material.

2. The reactor system of claim 1 further comprising one or more economizers.

3. The reactor system of claim 2 wherein the catalyst is located in the economizer.

4. The reactor system of claim 2 wherein the catalyst is located upstream of the economizer.

5. The reactor system of claim 2 wherein the catalyst is located downstream of the economizer.

6. The reactor system of claim 1 further comprising a boiler stack downstream of the boiler and wherein the catalyst is located at a point between an exit of the boiler and an end of the stack.

7. The reactor system of claim 6 wherein the catalyst is located in the stack.

8. The reactor system of claim 1 further comprising one or more inlets for introducing one or more reducing agent agents downstream of the boiler.

9. The reactor system of claim 8 wherein the inlet is upstream of the catalyst.

10. The reactor system of claim 8 wherein the reducing agent comprises ammonia.

11. The reactor system of claim 8 wherein the reducing agent comprises one or more hydrocarbons.

12. The reactor system of claim 8 wherein the reducing agent comprises ammonia and one or more hydrocarbons.

13. The reactor system of claim 8 wherein the reducing agent comprises ethanol.

14. The reactor system of claim 1 wherein the catalyst comprises
   about 1 to about 20 weight % of the first component,
   about 2 to about 35 weight % of the second component, and
   about 10 to about 90 weight % of the zeolite, and
   about 10 to about 90 weight % of an oxygen storage material, wherein the weight percentages of the first component and the second component are on the basis of the metals.

15. The reactor system of claim 1 wherein the zeolite is selected from the group consisting of ZSM-5, ZSM-11, ZSM-12, ZSM-18, ZSM-23, MCM-zeolites, mordenite, faujasite, ferrierite, zeolite beta, and mixtures thereof.

16. The reactor system of claim 1 wherein the zeolite has a silica to alumina molar ratio of greater than about 1.

17. The reactor system of claim 1 wherein the zeolite has a silica to alumina molar ratio of about 1 to about 100.

18. The reactor system of claim 1 wherein the oxygen storage material is selected from the group consisting of $Ce_{1-a}Zr_aO_2$ and $Ce_{1-c-d}Zr_cLan_dO_2$, wherein Lan is selected from the group consisting of Y, La, Pr, Nd, Sm, Eu, Gd, Ho, Yb and mixtures thereof.

19. The reactor system of claim 1 further comprising an inorganic oxide.

20. The reactor system of claim 19 wherein the inorganic oxide is selected from the group consisting of alumina, silica, titania, zirconia and silica-alumina solutions, composites, and mixtures thereof.

21. The reactor system of claim 1 wherein the first component is a combination of copper and manganese,
   the second component is cerium,
   the zeolite is ZSM-5, and
   the oxygen storage material is CeZrNdPr oxide.

22. The reactor system of claim 21 wherein the zeolite has a silica to alumina molar ratio of about 1 to about 100.

23. The reactor system of claim 1 wherein the boiler comprises an industrial boiler.

24. The reactor system of claim 1 wherein the boiler comprises a commercial boiler.

25. The reactor system of claim 1 wherein the boiler uses a burner.

26. The reactor system of claim 25 wherein the burner is a low $NO_x$ burner.

27. The reactor system of claim 25 wherein the burner is an ultra low $NO_x$ burner.

28. The reactor system of claim 25 wherein the burner uses a fuel.

29. The reactor system of claim 28 wherein the fuel comprises natural gas.

30. The reactor system of claim 1 wherein the catalyst comprises an extruded catalyst.

31. The reactor system of claim 1 wherein the catalyst comprises at least one extruded component.

32. The reactor system of claim 1 wherein the zeolite is extruded.

33. The reactor system of claim 1 wherein the catalyst comprises a coated catalyst.

34. The reactor system of claim 1 wherein the catalyst comprises beads.

35. The reactor system of claim 1 wherein the catalyst comprises pellets.

36. The reactor system of claim 1 wherein the catalyst is located in one or more cassettes.

37. The reactor system of claim 1 wherein the catalyst is placed on at least one substrate, wherein the substrate is formed into at least one cassette.

38. The reactor system of claim 1 wherein the first component is selected from manganese and copper.

39. The reactor system of claim 1 wherein the second component is cerium.

40. The reactor system of claim 1 wherein the first component is selected from manganese and copper, the second component is cerium, and the zeolite is ZSM-5.

* * * * *